T. F. Lippincott,
Harvester Dropper.
No. 98.075.    Patented Dec. 21, 1869.
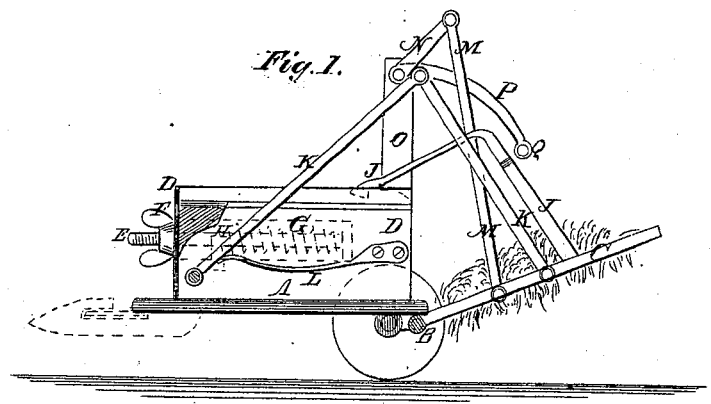
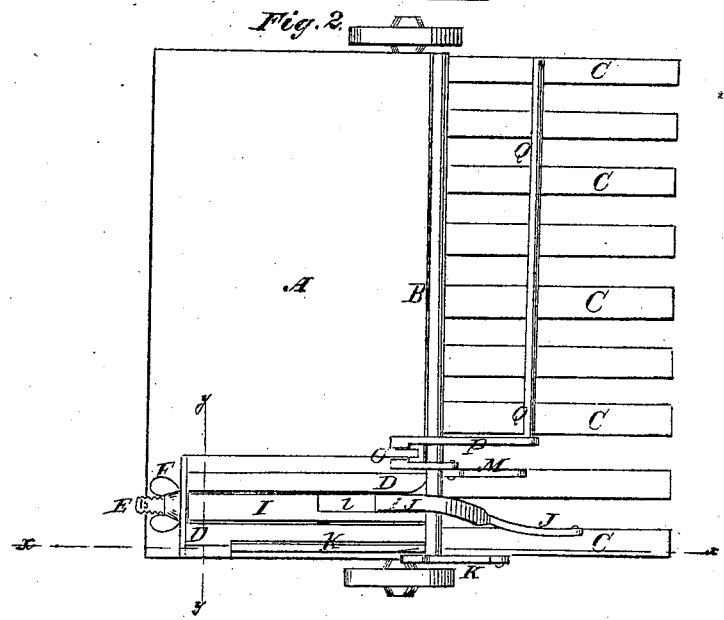

UNITED STATES PATENT OFFICE.

T. F. LIPPINCOTT, OF CONEMAUGH, PENNSYLVANIA.

IMPROVED HARVESTER-DROPPER.

Specification forming part of Letters Patent No. 98,075, dated December 21, 1869.

*To all whom it may concern:*

Be it known that I, T. F. LIPPINCOTT, of Conemaugh, in the county of Cambria and State of Pennsylvania, have invented a new and useful Improvement in Self-Dropper for Reapers; and I do hereby declare that the following is a full, clear, and exact description thereof, which will enable others skilled in the art to make and use the same, reference being had to the accompanying drawings, forming part of this specification, in which—

Figure 1 is a side view of my improved self-dropper, partly in section, through the line $x\,x$, Fig. 2. Fig. 2 is a top view of the same. Fig. 3 is a detail sectional view of the same, taken through the line $y\,y$, Fig. 2.

Similar letters of reference indicate corresponding parts.

My invention has for its object to furnish an improved self-dropper for reapers which shall be so constructed as to operate automatically to fall and deposit the grain, and to rise to receive another supply, making the gavels all of about the same size; and it consists in the construction and combination of the various parts of the device, as hereinafter more fully described.

A represents the finger-bar of the reaper, to or beneath the rear edge of which is pivoted a shaft, B, having rearwardly-projecting arms C rigidly attached to it. To the upper side of the inner end of the finger-bar A, or to the frame of the machine, is attached a block or box, D. Within the block or box D is placed a rod, E, having a disk or cross-head attached to its inner end, and a hand-nut, F, screwed upon its outer end, which projects through the forward end of the said box D. Upon the rod E is placed a coiled spring, G, the rear end of which rests against the disk or cross-head attached to the inner end of the rod E, and the forward end of which rests against the eye-plate H, which has a stem formed upon its upper edge, which passes up through a slot in the top of the box D, and to the upper end of which is attached a plate, I, which slides in grooves or ways formed upon or attached to the upper side of the said box D. Upon one side of the rear part of the top of the sliding plate I is formed a notch, $i$, the rear end of which is inclined toward the open side of said notch, as shown in dotted lines in Fig. 2, so that, when the said slide I has been drawn back by the spring-catch J, the head of the catch J, which is also made inclined, may slip out of the notch $i$, allowing the dropper B C to fall. The forward end of the spring-catch J is beveled off upon its lower side, and the rear end of the slide I is beveled off upon its upper side, so that when the dropper B C is again raised the catch J may slide forward and again catch in the notch $i$. The catch J is curved, as shown in Fig. 1, and its lower end is attached to one of the dropper-arms C. The catch J is so formed that it may spring laterally and vertically to give it the two motions required for catching upon and releasing the slide I.

By this construction, as the grain falls upon the dropper B C its weight gradually compresses the spring G, and draws back the slide I until the catch J is released, allowing the dropper B C to fall, dropping the gavel. As the same weight upon the dropper will be required each time to compress the spring to the same point, this construction insures the gavels being always of about the same size. By adjusting the tension of the spring G by means of the rod E and thumb-nut F, the gavels may be made larger or smaller, as desired. By smoothing off one side of the forward end of the rod E and forming upon it a scale of division-marks, accompanied by numbers, the nut F may be conveniently and accurately adjusted to form the gavels of any desired weight or size.

K is a jointed arm one end of which is pivoted to one of the arms C of the dropper B C, and the other end of which is pivoted to the side of the box D, or to some other suitable support. L is a spring one end of which is attached to the side of the box D, or to some other suitable support, in such a position that its free end may press against the lower side of the jointed arm K. The spring L must be of such strength as to raise the dropper B C when said dropper has discharged the gavel. M is a connecting-rod the lower end of which is pivoted to one of the arms C of the dropper B C, and its upper end is pivoted to the crank-pin of the crank N, which is pivoted to the standard O, or to some other suitable support. With the crank N is rigidly connected a crank-arm, P, to which is attached a bar or rod, Q, extending along above the rear part of the cutter-bar A, so that, as the dropper B C falls to discharge a gavel, the rod or bar Q may move down into such a position as to prevent the grain from passing upon the said dropper. As the dropper B C again rises into position to receive the grain, the said movement of the dropper moves the guard-arm Q out of the way. The guard Q may be made adjustable by forming a series of holes in the crank-arm P to receive it.

Having thus described my invention, I claim as new and desire to secure by Letters Patent—

1. The combination of the rod E, spring G, adjusting-nut F, eye-plate H, sliding plate I, and spring-catch J with the dropper B C, substantially as herein shown and described, and for the purpose set forth.

2. The combination of the jointed rod K and spring L with the dropper B C, substantially as herein shown and described, and for the purpose set forth.

T. F. LIPPINCOTT.

Witnesses:
  W. A. KRISE,
  G. A. KREIS.